(12) United States Patent
Lo Cascio et al.

(10) Patent No.: US 11,131,177 B2
(45) Date of Patent: Sep. 28, 2021

(54) METHODS FOR DEEP RESERVOIR STIMULATION USING ACID-FORMING FLUIDS

(71) Applicants: Mauro Lo Cascio, Houston, TX (US); William L. Esch, The Woodlands, TX (US); Richard E. Beckham, Spring, TX (US); Edward C. Wanat, Houston, TX (US); Shawn Fullmer, Katy, TX (US); Chris Eric Shuchart, Spring, TX (US)

(72) Inventors: Mauro Lo Cascio, Houston, TX (US); William L. Esch, The Woodlands, TX (US); Richard E. Beckham, Spring, TX (US); Edward C. Wanat, Houston, TX (US); Shawn Fullmer, Katy, TX (US); Chris Eric Shuchart, Spring, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 589 days.

(21) Appl. No.: 15/962,508

(22) Filed: Apr. 25, 2018

(65) Prior Publication Data
US 2019/0010795 A1    Jan. 10, 2019

Related U.S. Application Data

(60) Provisional application No. 62/530,462, filed on Jul. 10, 2017.

(51) Int. Cl.
E21B 43/28    (2006.01)
E21B 43/26    (2006.01)
(Continued)

(52) U.S. Cl.
CPC ............. *E21B 43/283* (2013.01); *C09K 8/72* (2013.01); *E21B 43/16* (2013.01); *E21B 43/166* (2013.01); *E21B 43/26* (2013.01); *E21B 43/28* (2013.01)

(58) Field of Classification Search
None
See application file for complete search history.

(56) References Cited

U.S. PATENT DOCUMENTS 2,265,923 A * 12/1941 Normand ............... C09K 8/78
166/303
3,405,761 A * 10/1968 Parker .................. E21B 43/164
166/269

(Continued)

FOREIGN PATENT DOCUMENTS

CA    2767846 A1    8/2013
RU    2533393 C1    11/2014
WO    WO 2014/053912 A1    4/2014

OTHER PUBLICATIONS

Klerck et al. (2004) "Discrete fracture in quasi-brittle materials under compressive and tensile stress states", *Methods in Applied Mechanics and Engineering*, vol. 193, Issues 27-29, pp. 3035-3056.

(Continued)

*Primary Examiner* — William D Hutton, Jr.
*Assistant Examiner* — Avi T Skaist
(74) *Attorney, Agent, or Firm* — ExxonMobil Upstream Research Company—Law Department

(57) ABSTRACT

Described herein are methods and techniques for deep reservoir stimulation of a hydrocarbon-containing subsurface formation. The methods may comprise introducing or injecting a formation-dissolving fluid, such as a wet acid-forming gas, into the subsurface formation; allowing the formation-dissolving fluid, such as the wet acid-forming gas, (Continued)

to react with the subsurface formation for a period of time; and producing hydrocarbons from the subsurface formation.

26 Claims, 6 Drawing Sheets

(51) Int. Cl.
*E21B 43/16* (2006.01)
*C09K 8/72* (2006.01)

(56) References Cited

U.S. PATENT DOCUMENTS

| | | | | |
|---|---|---|---|---|
| 4,099,568 | A | * | 7/1978 | Allen .................... C09K 8/592 |
| | | | | 166/269 |
| 4,101,426 | A | | 7/1978 | Maly et al. |
| 4,217,956 | A | * | 8/1980 | Goss .................... E21B 43/164 |
| | | | | 166/272.1 |
| 4,271,905 | A | * | 6/1981 | Redford ................ C09K 8/594 |
| | | | | 166/272.3 |
| 4,333,529 | A | * | 6/1982 | McCorquodale ..... E21B 43/164 |
| | | | | 166/266 |
| 5,031,700 | A | | 7/1991 | McDougall et al. |
| 6,325,147 | B1 | | 12/2001 | Doerler et al. |
| 6,520,255 | B2 | | 2/2003 | Relton |
| 6,662,874 | B2 | | 12/2003 | Surjaatmadja et al. |
| 6,719,054 | B2 | | 4/2004 | Cheng et al. |
| 6,725,933 | B2 | | 4/2004 | Middaugh et al. |
| 6,772,847 | B2 | | 8/2004 | Rae et al. |
| 6,779,607 | B2 | | 8/2004 | Middaugh et al. |
| 6,938,690 | B2 | | 9/2005 | Surjaatmadja |
| 7,059,407 | B2 | | 6/2006 | Tolman et al. |
| 7,484,560 | B2 | | 2/2009 | Lal et al. |
| 7,500,517 | B2 | | 3/2009 | Looney et al. |
| 7,561,998 | B2 | | 7/2009 | Panga et al. |
| 7,657,415 | B2 | | 2/2010 | Panga et al. |
| 7,853,440 | B2 | | 12/2010 | Cohen et al. |
| 8,119,576 | B2 | | 2/2012 | Reyes et al. |
| 8,132,628 | B2 | | 3/2012 | Sanders et al. |
| 8,307,897 | B2 | | 11/2012 | Reyes et al. |
| 8,333,239 | B2 | | 12/2012 | Schneider et al. |
| 8,347,973 | B2 | | 1/2013 | Sanders et al. |
| 8,479,833 | B2 | | 7/2013 | Raman |
| 8,479,834 | B2 | | 7/2013 | Preston |
| 8,496,066 | B2 | | 7/2013 | Sanders et al. |
| 8,613,316 | B2 | | 12/2013 | Castrogiovanni et al. |
| 8,733,459 | B2 | | 5/2014 | Wallace |
| 8,746,334 | B2 | | 6/2014 | Coskuner |
| 8,794,322 | B2 | | 8/2014 | Reyes et al. |
| 8,796,187 | B2 | | 8/2014 | Reyes et al. |
| 8,851,169 | B2 | | 10/2014 | Nikipelo |
| 8,881,811 | B2 | | 11/2014 | Reyes |
| 8,881,837 | B2 | | 11/2014 | Sanders et al. |
| 8,904,853 | B2 | | 12/2014 | Reyes et al. |
| 9,109,440 | B2 | | 8/2015 | Qiu et al. |
| 9,115,579 | B2 | | 8/2015 | Schneider et al. |
| 9,150,780 | B2 | | 10/2015 | de Wolf et al. |
| 2009/0131285 | A1 | | 5/2009 | Wang et al. |
| 2010/0089578 | A1 | | 4/2010 | Nguyen et al. |
| 2010/0096128 | A1 | | 4/2010 | Hinkel et al. |
| 2010/0154514 | A1 | | 6/2010 | Algive et al. |
| 2010/0307765 | A1 | | 12/2010 | van Arkel et al. |
| 2010/0323933 | A1 | | 12/2010 | Fuller et al. |
| 2011/0108271 | A1 | | 5/2011 | Hinkel et al. |
| 2011/0146978 | A1 | | 6/2011 | Perlman |
| 2011/0290561 | A1 | | 12/2011 | Randall et al. |
| 2014/0053912 | A1 | | 2/2014 | Gregor et al. |
| 2014/0054040 | A1 | | 2/2014 | Zhao et al. |
| 2014/0202684 | A1 | | 7/2014 | Danait et al. |
| 2014/0202685 | A1 | | 7/2014 | Danait et al. |
| 2014/0209310 | A1 | | 7/2014 | Castrogiovanni et al. |
| 2014/0238680 | A1 | | 8/2014 | Castrogiovanni et al. |
| 2014/0251622 | A1 | | 9/2014 | Coates |
| 2014/0262240 | A1 | * | 9/2014 | Boone .................... E21B 43/267 |
| | | | | 166/250.01 |
| 2014/0262255 | A1 | | 9/2014 | Teletzke et al. |
| 2014/0262288 | A1 | | 9/2014 | Penny et al. |
| 2014/0352945 | A1 | | 12/2014 | Danait et al. |
| 2015/0053404 | A1 | | 2/2015 | Penny et al. |
| 2015/0053407 | A1 | | 2/2015 | Voordouw et al. |
| 2015/0060068 | A1 | | 3/2015 | Fernandez et al. |
| 2015/0068751 | A1 | | 3/2015 | Saboowala et al. |
| 2015/0218439 | A1 | | 8/2015 | Dean et al. |
| 2015/0309000 | A1 | | 10/2015 | Qiu et al. |
| 2015/0315889 | A1 | | 11/2015 | Schneider et al. |
| 2015/0345267 | A1 | | 12/2015 | Modavi et al. |
| 2015/0361330 | A1 | | 12/2015 | de Wolf et al. |
| 2016/0076369 | A1 | | 3/2016 | Ziauddin et al. |
| 2016/0160115 | A1 | | 6/2016 | Gamage et al. |

OTHER PUBLICATIONS

Gernert et al. (2016) "EOS-CG: A Helmholtz energy mixture model for humid gases and CCS mixtures", *Journal of Chemical Thermodynamics*, vol. 93, p. 274-293.

Spycher et al. (2003) "$CO_2$-$H_2O$ mixtures in the geological sequestration of $CO_2$. I. Assessment and calculation of mutual solubilities from 12 to 100° C. and up to 600 bar", *Geochimica et Cosmochimica Acta*, vol. 67, No. 16, pp. 3015-3031.

* cited by examiner

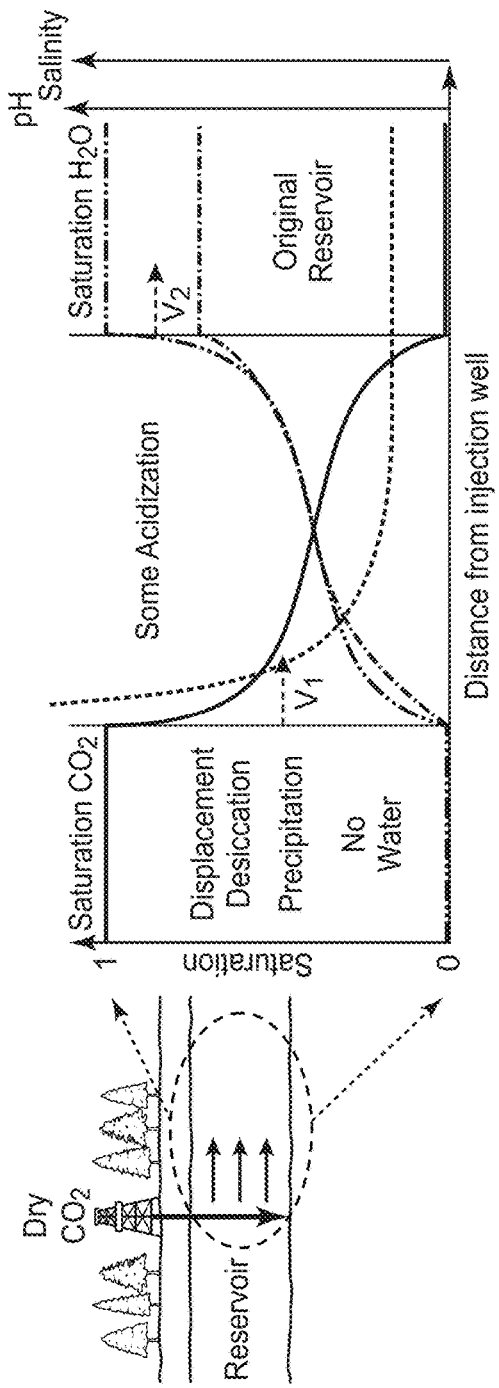
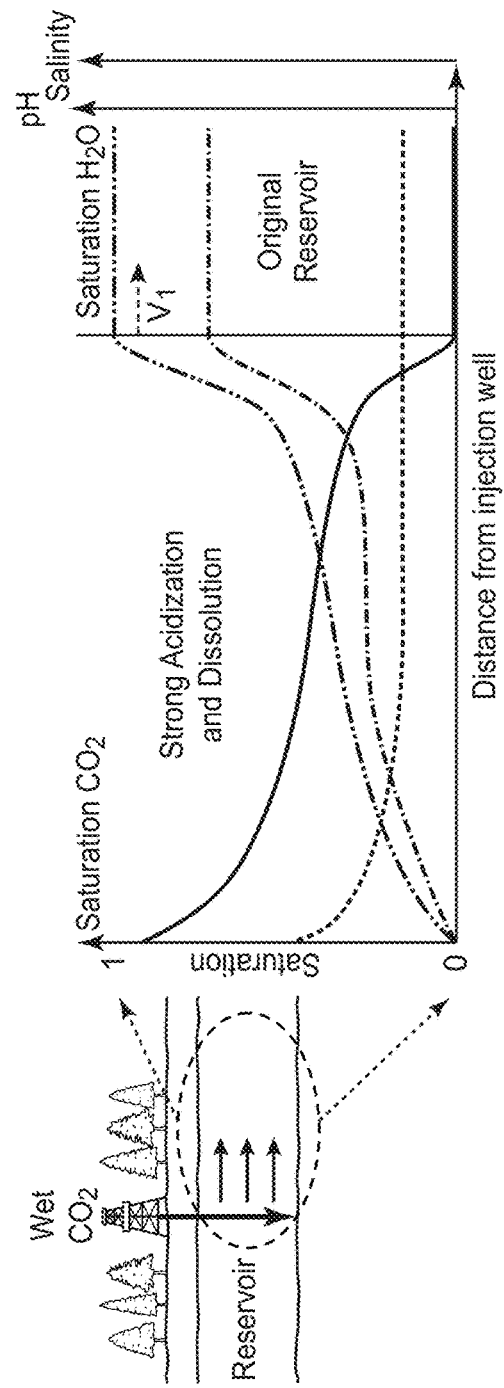
FIG. 3A
FIG. 3B

METHODS FOR DEEP RESERVOIR STIMULATION USING ACID-FORMING FLUIDS

CROSS REFERENCE TO RELATED APPLICATION

This application claims the benefit of U.S. Provisional Application Ser. No. 62/530,462, filed on Jul. 10, 2017, the disclosure of which is incorporated herein by reference.

FIELD OF THE INVENTION

The present disclosure relates to the field of hydrocarbon production operations. More specifically, the present disclosure relates to methods and techniques for stimulating a hydrocarbon reservoir using acid forming fluids such as wet acid-forming gases, and in particular, methods and techniques for stimulating tight reservoirs.

BACKGROUND

The production capacity of a hydrocarbon-containing subsurface formation (i.e., a hydrocarbon reservoir) may be related to a wide array of factors, including, but not limited to, the quantity of hydrocarbons present in the formation; the porosity and permeability of the formation; the pressure within the formation; the temperature within the formation; the viscosity of the hydrocarbons contained within the formation; the length of the wellbore that is exposed to the hydrocarbon-bearing strata; and the presence of water, gas, and/or other materials within the formation. Due to the variety of potential interactions among these various factors, the presence of hydrocarbons within a subsurface formation does not, in and of itself, indicate that the hydrocarbons may be economically recovered. Therefore, various techniques have been developed to increase the overall recovery of hydrocarbons from subsurface formations and to aid in the economic recovery of hydrocarbons from low permeability reservoirs.

For example, water injection techniques have been developed to increase the pressure within the formation, and steam injection techniques have been developed to increase the pressure of the formation and increase the temperature of the hydrocarbons within the formation (which can thereby decrease the hydrocarbon viscosity and allow the hydrocarbons to flow more readily). Additional thermal methods (e.g., hot water, steam, combustion, electrical heating) have been developed to change the viscosity of heavy oils, and non-thermal techniques (e.g., miscible or immiscible gas drives, alkane/surfactant/polymer water floods) have been developed to change the interfacial tension and improve the local displacement efficiency, as well as to improve the mobility ratio between the displaced phase (e.g., the hydrocarbons) and the displacing fluid (e.g., the water flood). As an example, U.S. Pat. No. 6,325,147 describes the use of a sweep fluid that comprises a gas dissolved in an aqueous phase. However, these methods can be very costly and do not always work in tight reservoirs (i.e., low permeability reservoirs) as the liquid sweep fluid often cannot travel any significant distance in the tight reservoir. Further, while the use of floods and sweeps can push hydrocarbons toward a production well, the floods and sweep fluids do not change the permeability the reservoir.

Further techniques have been developed for tight reservoirs. For example, hydraulic fracturing methods have been developed which consist of injecting viscous fracturing fluids (e.g., shear thinning, non-Newtonian gels or emulsions) into a formation at such high pressures and rates that the reservoir rock will "part" and form a network of fractures. The fracturing fluid may be mixed with a proppant material, such as sand, ceramic beads, or other granular material, to hold the fractures open after the hydraulic pressures are released. As another example, chemical stimulation techniques (e.g., matrix acidization techniques) have been developed where a chemical, such as an acid, that is capable of dissolving the rock matrix forming the hydrocarbon-bearing formation is injected through the well. The chemical acts to remove some of the rock material at the wellbore face and to clean out and enlarge the formation pores in the near-wellbore region. However, such stimulation techniques typically only affect the matrix in the near-wellbore environment (e.g., within 10 feet of the face of the wellbore) or the near frac-face environment when combined with fracking (i.e., acid fracking).

Attempts have been made to stimulate reservoirs away from the wellbore. For example, U.S. Patent Application No. 2014/0202684 describes methods for treating a subsurface formation with an acid-producing microorganism, and methods for flushing the wellbore with a wash fluid to push the microorganism deeper into the subsurface formation. However, microbial stimulation of a reservoir can be very unpredictable, requires feeding the microorganisms, and often shutting in the wellbore while the microorganisms incubate. As another example, U.S. Patent Application No. 2015/0345267 describes methods for forming extended wormholes by injecting guard fluids into guard wells to form pressure boundaries to direct the flow of the acid that is being used to create the wormholes. However, such wormhole formation lacks matrix support and thus, once the stimulation is complete, there is rapid production decay (due to the lack of pressure support from the surrounding rock matrix).

Thus, there remains a need for methods and techniques that enable deep stimulation of the rock matrix in a subsurface formation (i.e., enable permeability stimulation away from the near-wellbore environment or away from a hydraulically induced fracture), and, in particular, methods and techniques that are capable of deep stimulation in tight hydrocarbon reservoirs.

Additional background references may include U.S. Patent Application Publication Nos. 2009/0131285, 2010/0089578, 2010/0096128, 2010/0154514, 2010/0307765, 2010/0323933, 2011/0108271, 2011/0146978, 2014/0054040, 2014/0202684, 2014/0202685, 2014/0209310, 2014/0238680, 2014/0251622, 2014/0262255, 2014/0262288, 2014/0352945, 2015/0053404, 2015/0053407, 2015/0060068, 2015/0068751, 2015/0218439, 2015/0309000, 2015/0315889, 2015/0361330, 2016/0076369; U.S. Pat. Nos. 6,325,147, 6,662,874, 6,719,054, 6,725,933, 6,772,847, 6,779,607, 6,938,690, 7,484,560, 7,561,998, 7,657,415, 7,853,440, 8,119,576, 8,132,628, 8,307,897, 8,333,239, 8,347,973, 8,479,833, 8,479,834, 8,496,066, 8,613,316, 8,733,459, 8,794,322, 8,796,187, 8,881,811, 8,881,837, 8,746,334, 8,851,169, 8,904,853, 9,109,440, 9,115,579, 9,150,780; PCT Publication Nos. 2014/0053912; and Russian Patent No. 2533393 C1.

SUMMARY

Described herein are methods and techniques for deep reservoir stimulation of a hydrocarbon-containing subsurface formation. The methods may comprise introducing or injecting a formation-dissolving fluid, such as a wet acid-forming gas, into the subsurface formation; allowing the formation-dissolving fluid, such as the wet acid-forming gas, to react with the subsurface formation for a period of time; and producing hydrocarbons from the subsurface formation. In some embodiments, the formation-dissolving fluid, such as the wet acid-forming gas, may be introduced or injected into the subsurface formation using a downhole humidifier and/or nozzles whereby the velocity of the formation-dissolving fluid, such as the wet acid-forming gas, may be controlled as it is injected or introduced into the subsurface formation.

The formation-dissolving fluid, such as the wet acid-forming gas, preferably comprises a wetting agent and an acid-forming fluid. Preferably, the formation-dissolving fluid, such as the wet acid-forming gas, is in a single phase, such as a gaseous phase or a supercritical fluid phase, at reservoir conditions (i.e., the pressure and temperature of the subsurface formation at the point of introduction or injection into the subsurface formation). In preferred embodiments, the wetting agent comprises or is water. In preferred embodiments, the acid-forming fluid is selected from carbon dioxide, carbon monoxide, gaseous hydrochloric acid, chlorine gas, gaseous hydrogen sulfide, gaseous hydrofluoric acid, gaseous sulfur oxides, gaseous nitrogen oxides, and combinations thereof.

The injection of the formation-dissolving fluid, such as a wet acid-forming gas, may be done in conjunction with other enhanced oil recovery techniques and stimulation techniques. For example, the method described herein may be used in conjunction with hydraulic fracturing techniques, stimulation techniques that use acidic aqueous solutions, and/or the use of sweep or flood fluids.

DESCRIPTION OF THE FIGURES

FIG. 3A is a chart illustrating how during a dry $CO_2$ injection, the $CO_2$ gas travels from the wellbore into the reservoir.

FIG. 3B is a chart illustrating how during a water-saturated $CO_2$ injection, the saturated $CO_2$ gas travels from the wellbore into the reservoir.

DETAILED DESCRIPTION OF THE DISCLOSURE

Figure 1:
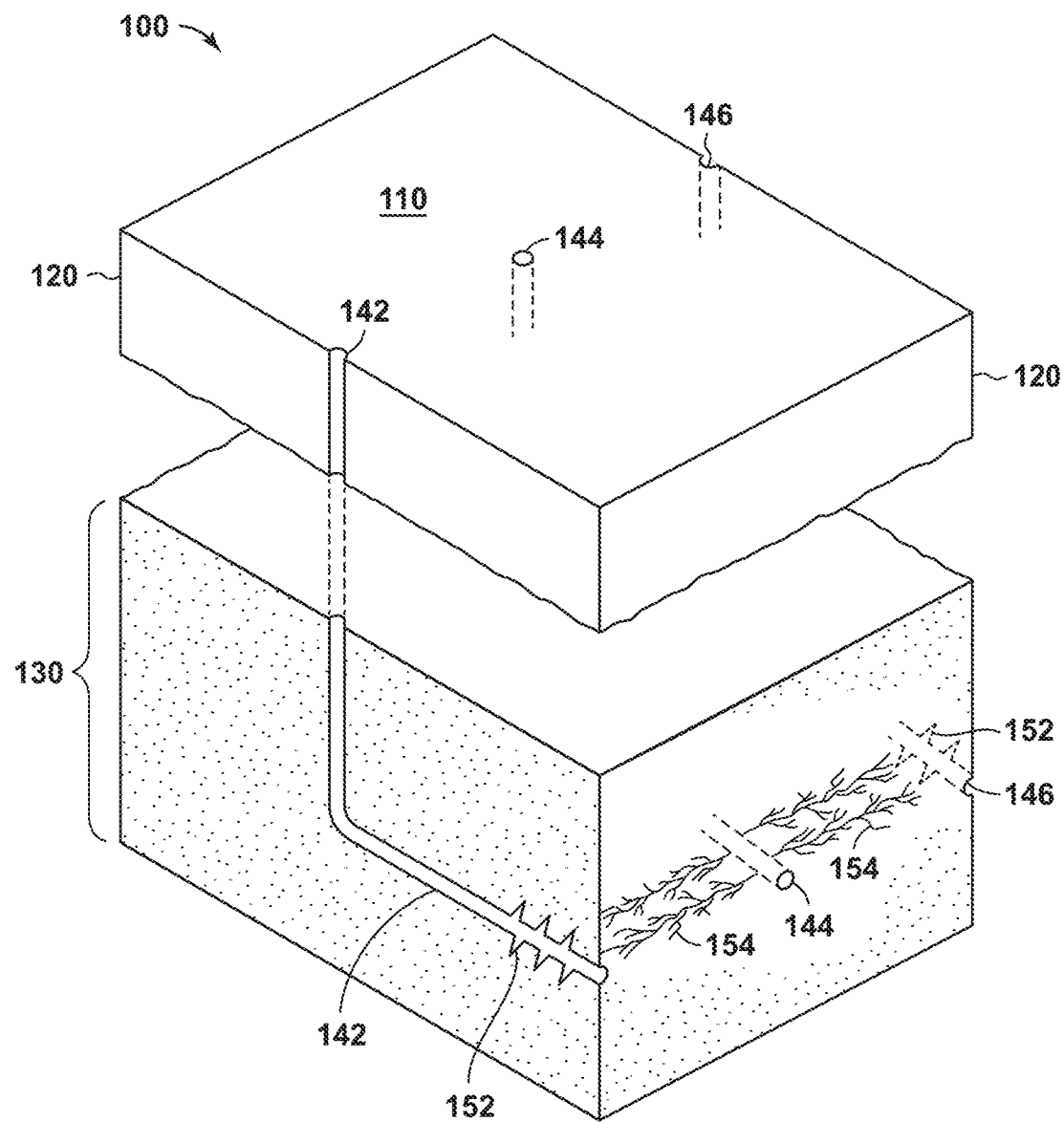
FIG. 1 is a perspective view of a hydrocarbon producing field having various wells drilled into the subsurface.

Various specific embodiments, versions, and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

Various terms as used herein are defined below. To the extent a term used in a claim is not defined below, it should be given the broadest possible definition persons in the pertinent art have given that term as reflected in at least one printed publication or issued patent.

As used herein, a "carbonate formation" is a subsurface formation having greater than about 50% by volume of inorganic carbonate materials. For example, limestone is essentially calcium carbonate. For example, dolomite is essentially a combination of calcium carbonate and magnesium carbonate, wherein at least 50% of the cations are magnesium. Thus, exemplary carbonate formations may comprise a majority of limestone, dolomite, and mixtures thereof.

As used herein a "sandstone formation" is a subsurface formation having greater than about 50% by volume of inorganic siliceous materials (e.g., sandstone).

As used herein, the term "hydrocarbons" refers to organic compounds that primarily, if not exclusively, comprise the elements hydrogen and carbon. Hydrocarbons generally fall into two classes: aliphatic hydrocarbons, also known as straight chain hydrocarbons, and cyclic hydrocarbons, also known as closed ring hydrocarbons. While hydrocarbons generally comprise the elements hydrogen and carbon, in some embodiments hydrocarbons may also comprise minor amounts of other elements or compounds, such as, but not limited to, halogens, metallic elements, nitrogen, oxygen, sulfur. Examples of hydrocarbon-containing materials include any form of natural gas, oil, coal, and bitumen.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (i.e., 1 atm pressure and 15-20° C.). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extracting planning for periods of production, determining and planning equipment to be utilized and techniques to be utilized in extracting the hydrocarbons from the subsurface formation, and the like.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface.

The measurement data may include seismic data, gravity data, magnetic data, electromagnetic data, and the like.

As used herein, "hydrocarbon operations" refers to any activity associated with hydrocarbon exploration, hydrocarbon development, and/or hydrocarbon production. For example, hydrocarbon operations may comprise hydrocarbon management or managing hydrocarbons, which may include hydrocarbon extraction, hydrocarbon production, hydrocarbon exploration, identifying potential hydrocarbon resources, identifying potential well locations (such as injection and/or production wells), determining well injection and/or extraction rates, identifying reservoir connectivity, acquiring hydrocarbon resources, disposing of and/or abandoning hydrocarbon resources, reviewing prior hydrocarbon management decisions, and any other hydrocarbon related acts or activities.

As used herein, "hydrocarbon production" or "producing hydrocarbons" refers to any activity associated with extracting hydrocarbons from a well or other opening. Hydrocarbon production normally refers to any activity conducted to form the wellbore along with any activity in or on the well after the well is completed. Accordingly, hydrocarbon production or extraction includes not only primary hydrocarbon extraction but also secondary or tertiary production techniques, such as injection of gas or liquid for increasing drive pressure, mobilizing the hydrocarbon or treating the well by, for example chemicals, hydraulic fracturing of the well to promote increased flow, well servicing, well logging, and other well and wellbore treatments.

As used herein, the term "fluid" refers to gases, liquids, and combinations of gases and liquids, as well as to combinations of gases and solids where the gas is the majority component of the fluid, and combinations of liquids and solids where the liquid is the majority component of the fluid.

As used herein, the term "fracture" refers to any local separation or a discontinuity plane in a geological formation. A fracture may be a fault/shear (Mode II and/or Mode III) fracture or joint/opening (Mode I) fracture. The term "joint" or "Mode I fracture" refers to a fracture in rock where there has been no or insignificant lateral movement in the plane of the fracture (e.g., up, down, or sideways) of one side relative to the other. See e.g., Klerck et al. (2004), "Discrete fracture in quasi-brittle materials under compressive and tensile stress states", *Methods in Applied Mechanics and Engineering*, Vol. 193, Issues 27-29, pp. 3035-3056. Thus, a joint or Mode I fracture is different from a fault or shear fracture (Mode II or Mode III) which is defined as a fracture in rock where one side slides laterally past the other.

As used herein, the term "natural fracture" refers to any fracture in the subsurface that is not produced by human activities, such as drilling, incidental or intentional hydrofracturing, core handling, etc. The term "natural fractures" is used to distinguish fractures that form due to geological causes, such as tectonic loading (e.g. regional compression/extension), folding, faulting, slip on pre-existing surfaces, pore pressures, erosion/unloading, material heterogeneity, and heating or cooling of joints, from those fractures that are formed by human activities.

As used herein, "permeability" is the capacity of a rock or other structures to transmit fluids through the interconnected pore spaces of the structure.

As used herein, the terms "produced fluids" and "production fluids" refer to liquids and/or gases removed from a subsurface formation. Produced fluids may include both hydrocarbon fluids and non-hydrocarbon fluids.

As used herein the term "region" refers to an area or volume of geologic interest, and may be associated with the geometry, attitude, and arrangement of the area or volume at any scale (e.g., millimeters (mm) to kilometers (km)). A region may have characteristics such as folding, faulting, cooling, unloading, and/or fracturing that has occurred therein.

As used herein, the term "region of interest" refers to an interval, compartment, or reservoir where hydrocarbons, non-hydrocarbon gases, and/or water may reside. Likewise, "regions of interest" may refer to multiple intervals, compartments, or reservoirs where hydrocarbons, non-hydrocarbon gases, and/or water may reside.

As used herein, "subsurface" means geologic strata occurring below the Earth's surface. For example, the subsurface may be beneath the top surface of any mass of land at any elevation or over a range of elevations, whether above, below, or at sea level, and/or beneath the floor surface of any mass of water, whether above, below, or at sea level.

As used herein, the terms "subsurface interval" and "subsurface formation" refer to a formation or a portion of a formation wherein formation fluids reside. The fluids may be, for example, hydrocarbon liquids, hydrocarbon gases, aqueous fluids, or combinations thereof.

As used herein, the term "supercritical" refers to a fluid that exists at a temperature and pressure that is above the fluid's critical point values. As an example, the critical point of carbon dioxide occurs at a temperature of 31° C. and a pressure of 1,071 psia (7.4 MPa). At temperatures and pressures above carbon dioxide's critical point, carbon dioxide is in a supercritical state and therefore it is a single phase. As another example, the critical point of water occurs at a temperature of 374° C. and a pressure of 3,200 psia (22 MPa). Similarly, "subcritical" refers to a fluid that exists at a temperature and pressure that is below the fluid's critical point values which means that there is a distinct phase boundary between liquid and gas phases.

As used herein, the term "wellbore" refers to a hole in the subsurface made by drilling or insertion of a conduit into the subsurface. A wellbore may have a substantially circular cross-section, or other cross-sectional shape. As used herein, the term "well", when referring to an opening in a formation, may be used interchangeably with the term "wellbore".

As described above, various techniques have been used in the past to attempt to increase the permeability of hydrocarbon reservoirs in order to make the production of hydrocarbons from the reservoir more economical. However, conventional stimulation techniques often only stimulate the region near the well-bore and do not provide the matrix support needed to effectively produce hydrocarbons from the reservoir. The present application addresses these problems by providing methodologies and techniques for deep reservoir stimulation. That is, the present methods and techniques utilize a wet acid-forming gas that partially dissolves the reservoir, inducing a net permeability increase, and prevents the typical desiccation and scaling of the formation that is observed in conventional dry acid-gas injections. Thus, the present methods and techniques are able to effectively stimulate the subsurface formation away from the wellbore while providing matrix support for producing hydrocarbons.

The present methods and techniques may be further understood with reference to the Figures, which are described further below. In certain figures (such as FIG. 1), the top of the drawing page is intended to be toward the earth surface and the bottom of the drawing page toward the well bottom. While wells are commonly completed in a substantially vertical orientation, it is understood that wells may also be inclined and or horizontally completed. Thus, when the descriptive terms "up and down" or "upper" and "lower" or similar terms are used in reference to a drawing or in the claims, they are intended to indicate relative location on the drawing page or with respect to well descriptions, and not necessarily an absolute orientation in the ground, as in at least some embodiments of the present inventions have utility no matter how the wellbore is oriented.

Figure 2:
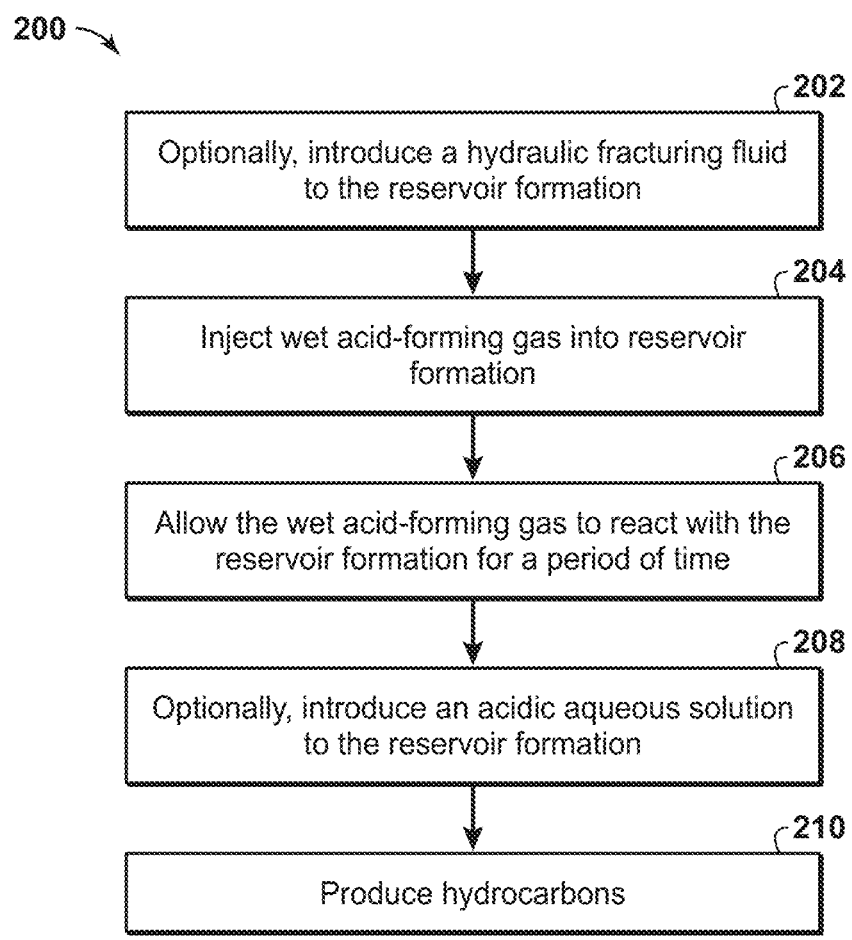
FIG. 2 is a workflow of an exemplary methodology in accordance with the present techniques.

The present methods and techniques described herein may also be better appreciated with reference to flow diagrams (such as those in FIG. 2). While for purposes of simplicity of explanation, the illustrated methodologies may be shown and described as a series of blocks in FIG. 2, it is to be appreciated that the methodologies are not limited by the order of the blocks, as some blocks can occur in different orders and/or concurrently with other blocks from that shown and described. Moreover, less than all the illustrated blocks may be required to implement various embodiments of an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

FIG. 1 is a perspective view of a hydrocarbon producing field 100. The field 100 is shown with a surface 110 and an overburden 120. The surface 110 is depicted as a land surface; however, the surface 110 could also be an ocean bottom or the bottom of another body of water, such as a bay or an estuary.

Below the overburden 120 is a subsurface formation 130. The subsurface formation 130 may be any distance below the surface 110 and the overburden 120. For example, the subsurface formation 130 may be greater than 500 feet below the surface 110, or greater than 1000 feet, or 1500 feet, or 1750 feet, or 2000 feet, or 2500 feet, or 3000 feet, or 4000 feet, or 5000 feet, or 7500 feet, or 10,000 ft., or 15,000 feet, or 20,000 feet, or 25,000 feet, or 30,000 ft. below the surface 110.

The subsurface formation 130 is comprised of a rock matrix. The rock matrix may be of any type and of any permeability. However, the methods and techniques described herein may be particularly useful in subsurface formations that are comprised of a rock matrix having a low permeability before the introduction of the wet acid-forming gas. For example, the rock matrix may have a permeability of less than 250 milliDarcies ("mD"), or less than 100 mD, or less than 75 mD, or less than 50 mD, or less than 25 mD, or less than 20 mD, or less than 15 mD, or less than 10 mD, or less than 5 mD, or less than 3 mD, or less than 2 mD, or less than 1 mD. For example, the methods and techniques described herein may be useful in subsurface formations that have a rock matrix having a permeability of at least $10^{-9}$ mD, or at least 0.001 mD, or at least 0.01 mD, or at least 0.1 mD. Thus, in some embodiments, the rock matrix may be a tight reservoir having a permeability in the range of from about $10^{-9}$ mD to about 25 mD, or from about 0.001 mD to about 5 mD, or from about 0.01 mD to about 3 mD, or from about 0.01 mD to 2 mD, or from about 0.01 mD to 1 mD. The methods and techniques described herein may also be particularly useful in subsurface formations that are comprised of a rock matrix that comprises carbonate rock such as dolomite or limestone. For example, the rock matrix may comprise at least 5% carbonate rock, or at least 20% carbonate rock, or at least 30% carbonate rock, or at least 40% carbonate rock, or at least 50% carbonate rock, or at least 60% carbonate rock, or at least 75% carbonate rock.

In the field 100, various wells 142, 144, and 146 are competed in the subsurface formation 130. Each wellbore defines a bore that extends from the surface and into the Earth's subsurface. While not illustrated in FIG. 1, each wellbore may comprise one or more annular regions defining one or more conduits or flow paths or channels through the well.

In FIG. 1, the wells are shown as having been drilled vertically and then completed horizontally. However, the wells may be of any orientation in the field 100. Further, in FIG. 1, each well is shown as having been completed in substantially the same azimuth. However, in practice the wells may be in any azimuth within the subsurface formation.

As part of the completion process, a wellhead may be installed at the surface of the well. The wellhead controls the flow of production fluids from the subsurface to the surface, or the injection of fluids from the surface into the wellbore. Fluid gathering and processing equipment such as pipes, valves, and separators may also be provided at the wellhead.

FIG. 2 is a flow diagram 200 of an exemplary method in accordance with embodiments of the present techniques. The method comprises injecting a wet acid-forming gas into a subsurface formation, allowing the wet acid-forming gas to react with the subsurface formation for a period of time, and producing hydrocarbons.

At block 204 a wet acid-forming gas is introduced or injected into the subsurface formation. The wet acid-forming gas may comprise a wetting agent and an acid-forming fluid. For example, the wetting agent in the wet acid-forming gas may be water. For example, the acid-forming fluid in the acid-forming gas may comprise carbon dioxide ($CO_2$), carbon monoxide (CO), hydrochloric acid gas ("HCl"), chlorine gas ("$Cl_2$"), hydrogen sulfide ("$H_2S$"), hydrofluoric acid ("HF"), sulfur oxides ("$SO_x$") such as sulfur dioxide ("$SO_2$"), nitrogen oxides ("$NO_x$") such as nitrous oxide ("$NO_2$"), organic acids in the gaseous phase such as gaseous acetic acid and/or gaseous formic acid, and combinations thereof. In preferred embodiments, the wet acid-forming gas comprises water and carbon dioxide.

In some embodiments, the wet acid-forming gas may be co-injected into the wellbore with other gases. For example, the wet acid-forming gas may be co-injected with a hydrocarbon gas stream, such as a hydrocarbon gas stream comprising methane. Thus, in some embodiments, the wet acid-forming gas may be from a waste stream from an industrial process or reservoir. For example, the wet acid-forming gas may be from a gaseous waste stream recovered at the wellhead that comprises methane and carbon dioxide, or a waste stream recovered at the wellhead that comprises methane, carbon dioxide, and hydrogen sulfide.

In embodiments where the subsurface formation is tight (e.g., less than 50 mD), it may not be desirable to use an emulsion of the wet acid-forming gas to avoid relative permeability effects. Thus, in some preferred embodiments, the wet acid-forming gas is not in an emulsion and does not comprise an emulsion.

The wet acid-forming gas is preferably in a single phase when it enters the subsurface formation under reservoir conditions. For example, the wet acid-forming gas may be a gas or a supercritical fluid when it enters the subsurface formation under reservoir conditions.

The wet acid-forming gas is preferably a saturated acid-forming gas, such as a water saturated acid-forming gas. That is, the wet acid-forming gas comprises the maximum amount of the wetting agent (e.g., water) as can be held by the acid-forming fluid while still being in a single phase (i.e., in the gas or supercritical fluid phase) at reservoir conditions. Thus, the amount of wetting agent used to saturate the acid-forming fluid will depend on the wetting agent used, the acid-forming fluid used, and the reservoir conditions. As such, the amount of wetting agent used to saturate the acid-forming fluid can be determined using known equations of state and solubility at different pressure and temperature conditions. For example, Gernert et al., "EOS-CG: A Helmholtz energy mixture model for humid gases and CCS mixtures", *Journal of Chemical Thermodynamics*, Vol. 93, pp. 274-293 (2016), describes equations of state for thermodynamic properties of various humid gases over a range of temperatures and pressures. As another example, Spycher et al., "$CO_2$-$H_2O$ mixtures in the geological sequestration of $CO_2$. I. Assessment and calculation of mutual solubilites from 12 to 100° C. and up to 600 bar", *Geochimica et Cosmochimica Acta*, Vol. 67, No. 16, pp. 3015-3031 (2003), describes calculation methods for calculating the composition of and solubilites of carbon dioxide and water mixtures. As a specific example, the hydrocarbon reservoir may have a pressure that ranges from about 2,000 psi (13.8 MPa) to about 10,000 psi (68.95 MPa) and a temperature that ranges from about 40° C. to about 120° C., and thus a wet acid-forming gas that comprises water as the wetting agent and carbon dioxide as the acid-forming fluid may be in a supercritical fluid phase at reservoir conditions and the amount of water in the carbon dioxide acid-forming gas may range from about 0.1 mole % to about 6 mole % or from about 0.5 mole % to about 5 mole % depending on the pressure and temperature of the subsurface formation.

Techniques for injecting gases and other fluids into a subsurface formation are known to those in the art. The wet acid-forming gas may be introduced or injected into the subsurface formation in any manner so long as it is in a single gaseous or supercritical phase when it reaches the target location in the subsurface formation. In some embodiments, the wet acid-forming gas may be prepared by mixing the wetting agent and the acid-forming fluid at the surface and injecting the wet acid-forming gas down the wellbore into the formation such that when it reaches the target location in the reservoir it is a gas or supercritical fluid at reservoir conditions. For example, the wet acid-forming gas may be driven into a wellbore by a pumping system that pumps the wet acid-forming gas into the wellbore. The pumping system may include mixing or combining devices, where the wetting agent and the acid-forming fluid may be mixed or combined prior to being pumped into the wellbore. The mixing or combining device may be controlled (e.g., may control the ratio of the wetting agent to the acid-forming fluid) to ensure that the wet acid-forming gas will be in the gaseous or supercritical phase when the wet acid-forming gas is contacted with the subsurface formation.

In some embodiments, the wet acid-forming gas may be formed downhole. In such embodiments, the wetting agent and the acid-forming fluid may be introduced to the wellbore in separate conduits and maintained separated until they reach the target location in the subsurface formation where they are allowed to mix to form the wet acid-forming gas. The downhole mixing of the wetting agent and the acid-forming fluid may be accomplished by using a downhole humidifier or other device that is capable of mixing the wetting agent and the acid-forming fluid to form a single phase gas or a supercritical fluid at reservoir conditions.

Thus, for example, within the wellbore there may be a plurality of pipes, tubes, sheaths, and/or linings which may serve as conduits to convey material between the surface and the subsurface formation and from the subsurface formation to the surface. The wetting agent and the acid-forming fluid may traverse down the wellbore in separate conduits. In some embodiments, there is a down-hole humidifier that acts to vaporize the wetting agent and mix the wetting agent with the acid-forming fluid to form the wet acid-forming gas at reservoir conditions.

The down-hole humidifier may comprise a fluid mixing assembly and a heater. The down-hole humidifier may receive the injected fluids, in the form of (liquid) wetting agent and gas (acid-forming fluid). The wetting agent may be pressurized by an optional pump before being supplied to the fluid mixing assembly while the gas may be pressurized by a compressor before being supplied to the fluid mixing assembly. The fluid mixing assembly may include a mixing volume that may comprise any vessel for suitable for combining injected fluids, such as to generate the wet acid-forming gas. Illustrative, non-exclusive examples of suitable mixing volumes may include a tank, pressure tank, pressure vessel, steam generator, superheater, heat exchanger, boiler, and/or heated pipe. The mixing volume may be designed to withstand high internal pressures, such as at least 1000 psia, or at least 1500 psia, or at least 2000 psia, or at least 2500 psia, or at least 3000 psia, or at least 3500 psia, or at least 4000 psja, or at least 4500 psia, or at least 5000 psia, or at least 10,000 psia. When present, the pump may include any suitable structure for increasing the pressure of the wetting agent. Illustrative, non-exclusive examples of pumps include suitable centrifugal, rotary vane, diaphragm, bellows, drum, flexible liner, flexible impeller, gear, peristaltic, progressive cavity, rotary lobe, and/or positive displacement pump. When present, the compressor may comprise any suitable structure for increasing the pressure of the acid-forming fluid. Illustrative, non-exclusive examples of compressors may include reciprocating, rotary screw, and/or centrifugal compressors.

The down-hole humidifier may further include a heater to heat the mixing volume. For example, the heater may comprise a fuel-fired heater and/or electric heater. The heat may be used to vaporize the wetting agent. The temperature, total pressure, and/or partial pressure of the wetting agent and acid-forming fluid may be maintained, regulated, or otherwise controlled to ensure that when the wet acid-forming gas is introduced to the subsurface formation it is in a single phase that is a gaseous phase or a supercritical fluid phase.

Thus, in some embodiments of the present methods and techniques, the method may further comprise supplying a stream of a wetting agent to a downhole humidifier, wherein the downhole humidifier comprises a heater and a mixing volume; supplying a stream of an acid-forming fluid to the downhole humidifier; heating the wetting agent and the acid-forming fluid; generating in the downhole humidifier the wet acid-forming gas; and introducing the wet acid-forming gas to the subsurface formation.

Regardless of whether the wet acid-forming gas is formed at the surface or downhole, the wet acid-forming gas may be introduced or injected into the subsurface formation using a variety of completions (e.g., openhole, cased and perforated), treatment methods (e.g., packers, jet nozzles, ball sealers, and/or diverting agents). For example, in some embodiments, the wet acid-forming gas may be injected into the subsurface formation through one or more nozzles (such .as jet nozzles). The nozzles may be of variable sizes and may be used to control the injection pressure and velocity. For example, smaller sized nozzles may be used to create high velocity injections into low permeability reservoirs. Examples of jetting assemblies that may be used are described in U.S. Patent Application Publication No. 2011/0290561 and in U.S. Pat. Nos. 6,520,255 and 7,059,407.

In some embodiments, the injection of the wet acid-forming gas into the subsurface formation may be controlled such that the wet acid-forming gas is injected into the subsurface formation at a pressure that is below the formation parting pressure. That is, the wet acid-forming gas may be injected into the subsurface formation at a pressure that is less than the pressure that would cause fracturing of the formation.

Returning to FIG. 1, the wet acid-forming gas may be introduced to the subsurface formation through a first wellbore 144 that is configured to introduce the wet acid-forming gas into the subsurface formation 130. This wellbore may also be the wellbore through which the hydrocarbons are produced, or in some embodiment, a separate production wellbore may be used.

In some embodiments, one or more guard wells may also be used to control the flow of the wet acid-forming gas in the subsurface formation. For example, one or more guard wells may be placed near the injection well 144 and may be configured to inject a pressure-building fluid or substance, such as water and/or brine. Additional examples of a pressure-building substance include a mobility-limiting fluid that comprises a polymer. Injection of the pressure-building fluid can create pressure boundaries on either side of the injection well 144, which can be used to direct the wet acid-forming fluid in the subsurface formation. Thus, the guard wells can be used to create high pressure boundaries to beneficially direct the flow of the wet acid-forming gas through the subsurface in a desired direction. Reservoir modeling techniques may be used to determine whether or not it would be desirable to utilize guard wells and if so, where they should be placed to optimize the directional flow of the wet acid-forming gas within the subsurface formation. For example, reservoir modeling techniques can be used to predict how the manipulation of the reservoir's pressure field by injecting guard fluids will alter the flow direction of the wet acid-forming gas in the subsurface in order to reach more impermeable sections of the subsurface formation.

In general, the wet acid-forming gas injected from the wellbore into the subsurface formation will flow cross the local pressure gradient in the subsurface formation. If the permeability is locally uniform, the injected gas will flow radially away from the injection well in the absence of any additional pressure gradient control. As described above, one or more guard wells may optionally be used to introduce high pressure boundaries to manipulate the pressure gradient around the injection well. By creating ridges of high pressure, the guard wells can generate a pressure gradient to guide the injected gas along an engineered/designed path. For example, a pressure gradient could be formed to prevent radial flow of the injected gas away from the wellbore, but instead to form a directional flow in one direction from the wellbore. Examples of uses of guard wells to control the direction of fluid injections are further described in U.S. Patent Application Publication No. 2015/0345267.

The wet acid-forming gas injection process described herein is not limited to any well orientation or any well architecture or any specific completion equipment. Such matters are within the discretion of the subsurface engineer, being driven by the reservoir characteristics and are determinable by one of ordinary skill in the art. Thus, a well may inject the wet acid-forming gas along its entire length, a portion of its length, or along separate lengths or points. The injection segments of a given well may be aligned or staggered with those of its neighboring wells depending on the characteristics of the reservoir. The portion of the wellbore through which the wet acid-forming gas is injected into the subsurface formation can be open-holed (or comprise no casing) or can have previously received a casing. If cased, the casing is desirably perforated prior to injection of the fluid.

Returning to FIG. 2, at block 206 the wet acid-forming gas is allowed to react with the subsurface formation. That is, when the wet acid-forming gas contacts the subsurface formation the wet acid-forming gas dissolves into the formation water thereby lowering the local pH within the subsurface formation by forming an acid (e.g., carbon dioxide and water form carbonic acid). The acid then reacts with the rock matrix dissolving the formation minerals until the formation water becomes saturated with respect to the minerals being dissolved under this new set of acidized conditions. As shown in FIG. 3B, the extent of this acidizing zone corresponds to the extent of the acid-forming gas in the reservoir. Therefore, the stimulation zone length is determined by the distance the gas or supercritical fluid travels within the reservoir. As seen in FIG. 1, within this dissolution zone both wormholes and matrix dissolution 154 will extend from the wellbore 144.

The wet acid-forming gas may be allowed to react with the subsurface formation for a predetermined amount of time. For example, the wet acid-forming gas may be allowed to react with the subsurface formation for a period of time of greater than 1 hour, or greater than 5 hours, or greater than 6 hours, or greater than 10 hours, or greater than 12 hours, or greater than 18 hours, or greater than 24 hours, or greater than one day, or greater than week, or greater than a month. For example, the wet acid-forming gas may be allowed to react with the subsurface formation for a time period of less than 1 year, or less than 1 week, or less than 3 days, or less than 1 day. For example, a suitable period of time may be a time period between any lower limit to any upper limit described above. In some embodiments, the wet acid-forming gas may be allowed to react with the subsurface formation for a period of time from 1 hour to 48 hours, or from 12 hours to 36 hours, or from 18 hours to 30 hours, or for a time period of about 24 hours.

In some embodiments, reservoir modeling techniques may be used to determine the amount of wet acid-forming gas that is injected into the subsurface formation and/or the amount of time needed to inject the wet acid-forming gas into the subsurface formation. For example, reservoir modeling can be used to calculate the time needed in order for the wet acid-forming gas to disperse a certain distance from the wellbore. For example, if it is desired that the wet acid-forming gas travel 100 meters from the wellbore, a reservoir model can be used to calculate the amount of time that is needed to reach that distance given the pressure, rock type, etc., in the subsurface formation. The reservoir modeling techniques may use computational fluid dynamics modeling of the target formation to predict the flow path of the wet acid-forming gas through the subsurface formation. For example, finite difference, finite element, or Lattice Boltzmann modeling methods may be used.

Thus, in some embodiments, determining the amount of time that the wet acid-forming gas is allowed to react with the rock matrix may include a prediction of the amount of time needed for the wet acid-forming gas to travel the desired distance from the wellbore, which may depend upon the lithology (i.e., rock type) of the formation (e.g., the fraction of dolomite vs. limestone), the porosity and permeability of the formation, and the reservoir conditions (e.g., pressure and temperature). In some embodiments, the rock type and/or mineralogy of the formation may be the most important factor in determining how long it will take the wet acid-forming gas to travel the desired distance from the wellbore, and thus how much wet acid-forming gas should be injected into the reservoir formation and how long to allow the wet acid-forming gas to react with the formation before beginning production of the hydrocarbons. For example, for formations that comprise greater of amounts of dolomite an increased amount of time may be needed for full reaction of the wet acid-forming gas with the rock matrix, while formations that comprise greater amounts of limestone or calcite may require a lesser amount of time for full reaction of the wet acid-forming gas with the rock matrix.

As described above, jetting nozzles may be used to introduce the wet acid-forming gas into the subsurface formation and, thus, increase the velocity of the acid in the formation's pores, and thus decrease the amount of time that is needed to allow the acid to travel farther from the wellbore.

In some embodiments, the period of time the wet acid-forming gas is allowed to react with the reservoir is not predetermined, but rather is determined based on a parameter being actively measured.

For example, the pressure at the wellhead may be monitored while the wet acid-forming gas is allowed to react with the reservoir. During injection as the pressure at the wellhead decreases, one can assume that the permeability of the formation has increased. Thus, it is expected that the formation pressure will initially increase due to the injection of the wet acid-forming gas but once the pressure levels out and begins to decrease, this can be an indication that the reaction of the wet acid-forming gas with the rock matrix is ongoing and a threshold can be set based on reservoir production modeling results to begin producing hydrocarbons. Similarly, the pH or electrical conductivity may also be monitored, and once the initial changes due to the wet acid-forming gas injection begin to level out or stabilize, they can be considered an indication that the reaction of the wet acid-forming gas with the rock matrix has completed sufficiently to being producing hydrocarbons.

Returning to FIG. 2, at block 210, hydrocarbons are produced from the subsurface formation. For example, producing hydrocarbons may include extracting hydrocarbons from the subsurface.

In some embodiments, hydrocarbon production may take place for a first period of time. Production may then be suspended for a period of time, and a second wet acid-gas injection treatment or a fracking treatment or other well stimulation treatment may take place. Production may then be recommenced for a second period of time. Thus, the injection of the wet acid-forming gas, fracture operations, acid stimulation techniques, and/or hydrocarbon production may be cycled.

The above wet acid-forming gas injection method may be used independent of reservoir fracturing operations. However in some embodiments, in addition to the steps of injecting the wet acid-forming gas at block 204, allowing the wet acid-forming gas to react with the rock matrix at block 206, and producing hydrocarbons at block 210, the methods and techniques described herein may also comprise further optional steps such as hydraulic fracturing. For example, at block 202, the subsurface formation may optionally be fractured by introducing a hydraulic fracturing fluid into the subsurface formation. Typically fracturing operations would occur before injecting the wet acid-forming gas, however, in some embodiments it could also occur after the wet acid-forming gas injection. For example, the method could comprise conducting fracturing operations on the wellbore, injecting a wet acid-forming gas into the wellbore, producing hydrocarbons from the wellbore after allowing the wet acid-forming gas to react with the rock matrix for a period of time, and then conducting fracture operations on the wellbore again or injecting additional wet acid-forming gas on the wellbore.

Hydraulic fracturing operation may comprise injecting fracture fluids into the formation at such high pressures and rates that the reservoir rock will "part" and form a network of fractures. The fracture fluid may be a viscous fluid, such as a shear thinning, non-Newtonian gel or emulsion. The fracture fluid may also be mixed with a proppant material such as sand, ceramic beads, or other granular materials. The proppant can act to hold the fractures open after the hydraulic pressures are released.

In some embodiment, the methods may further comprise matrix acidization or acid stimulation by the introducing an acidic aqueous solution to the subsurface formation at block 208. For example, an acidic aqueous solution may be introduced to the subsurface formation to clean the near wellbore environment (i.e., damage removal) and reduce the wellbore skin. That is, the acidic aqueous solution may be used to remove rock material near the wellbore face and enlarge formation pores in the near-wellbore region. The type of acidic solution used may depend on the lithology of the target formation. For example, sandstone reservoirs may be treated with a mixture of hydrochloric acid and hydrofluoric acid. This acid mixture will attack tiny clay particles, silicates, and feldspars in the near-wellbore region. As another example, carbonate reservoirs may be treated with a hydrochloric acid solution. In some embodiments, the acidic aqueous solution may be emulsified for deeper penetration of the acidic aqueous solution from the wellbore.

In some embodiments, the methods and techniques described herein may be used with enhanced oil recovery techniques. For example, the methods may be used in conjunction with floods to drive the hydrocarbons towards a production well. Thus, in some embodiments, the methods may comprise injecting a wet acid-forming gas through a first wellbore (e.g., well 144 in FIG. 1); allowing the wet acid-forming gas to react with the subsurface formation for a period of time; injecting a flood fluid such as water or brine through the first wellbore, wherein the flood fluid acts to displace hydrocarbons in the subsurface formation and sweep them towards a second wellbore (e.g., well 142 or 146 in FIG. 1); and producing hydrocarbons from the subsurface formation through the second wellbore. Conversely, in some embodiments, the methods may comprise injecting a wet acid-forming gas through a first wellbore (e.g., well 144 in FIG. 1); allowing the wet acid-forming gas to react with the subsurface formation for a period of time; injecting a flood fluid such as water or brine through a second wellbore (e.g., well 142 or 146 in FIG. 1), wherein the flood fluid acts to displace hydrocarbons in the subsurface formation and sweep them towards the first wellbore; and producing hydrocarbons from the subsurface formation through the first wellbore. Guard wells, as described above, may also be used to direct the wet acid-forming gas towards the first or second wellbore, as the case may be, and/or to direct the flood fluid towards the first or second wellbore, as the case may be, to further enhance the production of hydrocarbons. In either embodiments, the first and/or second wellbore may also be hydraulically fractured (e.g., the second wellbore may be hydraulically fractured to form perforations 152 near the wellbore of the second well 144 or 146) or have undergone an acidic aqueous solution treatments to further enhance the production of hydrocarbons.

An advantage of the present methods and techniques is that the use of a "wet" acid-forming gas allows the acid to travel an increased distance from the well, dependent on the time and injection rate, and allows for increased acidization and dissolution of the rock matrix without desiccation of the reservoir. For example, the matrix dissolution and wormholing effects may extend from the wellbore for more than 10 feet, or more than 30 feet, or more than 50 feet, or more than 75 feet, or more than 100 feet, or more than 300 feet, or more than 500 feet, or more than 750 feet, or more than 1,000 feet, such as for example up to about 5,000 feet from the wellbore.

The deep reservoir stimulation techniques described herein may also provide the additional benefit of the ability to provide for increased spacing of production wells. That is, as the present methods can be used to increase the distance of the zone of permeability around a production well, there is a decreased need for spacing multiple production wells in close proximity to one another. For example, in some embodiments, where without the present methods production wells were spaced one kilometer apart, when using the present methods the production wells may be placed five kilometers apart.

Thus, the processes described herein may provide for zones having increased permeability. For example, a zone having undergone a wet acid-forming gas treatment as described herein may exhibit an increase of permeability of at least 10%, or at least 50%, or at least 100%, or at least 200%, or at least 300%, or at least 400%, or at least 500%, or at least 1000%, or at least 2000%, or at least 3000%, or at least 4000%, or at least 5000%, or more, as compared to the permeability of the zone before the wet acid-forming gas treatment. Further, the zones of increased permeability may extend radially or laterally from the wellbore for more than 10 feet, or more than 30 feet, or more than 50 feet, or more than 75 feet, or more than 100 feet, or more than 300 feet, or more than 500 feet, or more than 750 feet, or more than 1,000 feet, such as for example up to about 5,000 feet from the wellbore.

FIGS. 3A and 3B provide a comparison of the effects of the introduction of a "dry" carbon dioxide gas into a wellbore and a "wet" carbon dioxide gas into a wellbore.

FIG. 3A illustrates how the injection of a dry $CO_2$ into a wellbore typically creates a desiccated zone near the wellbore which induces precipitation and, thus, a lowering of permeability in the near-wellbore environment. When the "dry" carbon dioxide gas is introduced into the subsurface formation, the initial carbon dioxide bubble reacts with the formation water and causes an evaporation of the formation water into the $CO_2$ bubble. This creates a $CO_2$-formation water mixing zone (with or without hydrocarbons, depending on the reservoir) between the injection area near the wellbore and the unaltered reservoir. In this mixing zone there may be a slight acidification of the formation, but any acidification is overwhelmed by the desiccation front that is created as the $CO_2$-front moves out from the wellbore. In FIG. 3A, Vi refers to the velocity of the $CO_2$ gas front and $V_2$ refers to the velocity of the $CO_2$-formation water mixing zone into the reservoir. Thus, as seen in FIG. 3A, as the "dry" carbon dioxide is introduced to the subsurface formation, the $CO_2$ reacts with the water in the near wellbore environment causing desiccation and precipitation near the wellbore. This effect is reduced as the $CO_2$ front travels further from the wellbore as it becomes saturated with water from the formation water. However, the damage due to the desiccation and precipitation of salts near the wellbore (and the resulting clogging of the pores in the rock matrix) decreases the permeability near the wellbore and, thus, reduces the ability to recover hydrocarbons near the wellbore.

Compared to FIG. 3A, FIG. 3B illustrates the use of a wet acid-forming gas injection as described herein. That is, FIG. 3B illustrates the use of a water-saturated $CO_2$ gas injection to stimulate the subsurface formation. As seen in FIG. 3B, because the $CO_2$ injection is pre-saturated with water, little to no desiccation occurs near the wellbore, and the $CO_2$ is able to acidify the formation water to induce dissolution of the rock matrix at great distances from the wellbore.

Figure 4A:
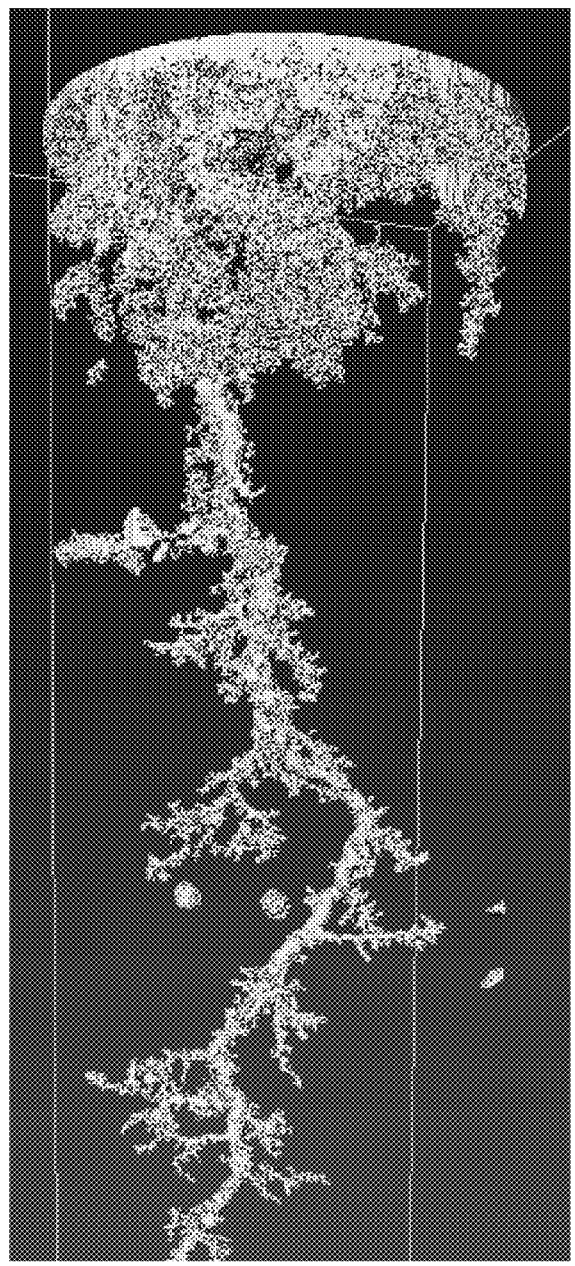
FIG. 4A is a micro-CT scan of a carbonate core sample that underwent an acid injection.

This effect is further illustrated with reference to FIGS. 4A, 4B, and 4C. FIG. 4A is a micro-CT scan of a carbonate core sample that underwent an acid injection according to embodiments of the present methodologies and techniques. The resolution of the image in FIG. 4A (1,000 μm voxel size) primarily shows the larger dissolution pathways (i.e., wormholes) that were formed.

Figure 4B:
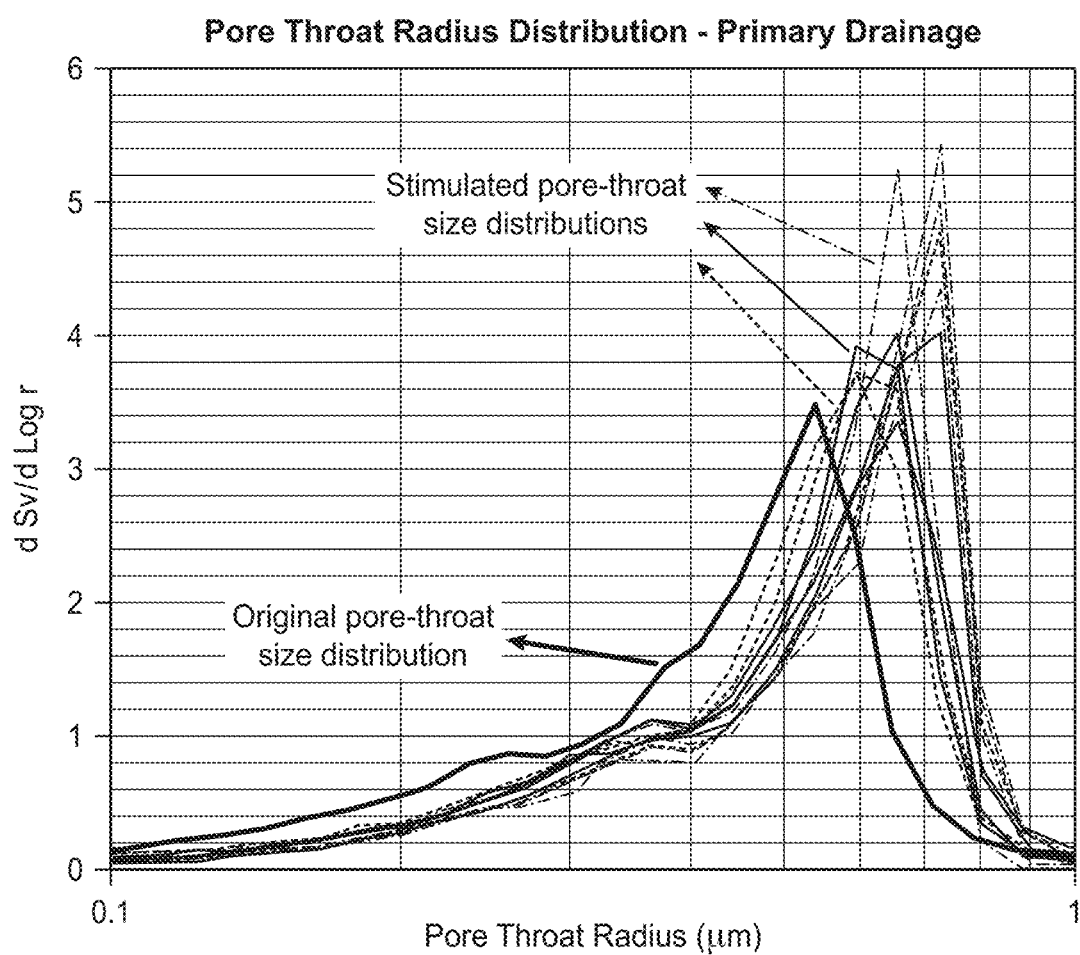
FIG. 4B is a drainage mercury injection capillary pressure ("MICP") chart illustrating the distribution of the pore-throat radii in samples taken from the core sample of FIG. 4A.
Figure 4C:
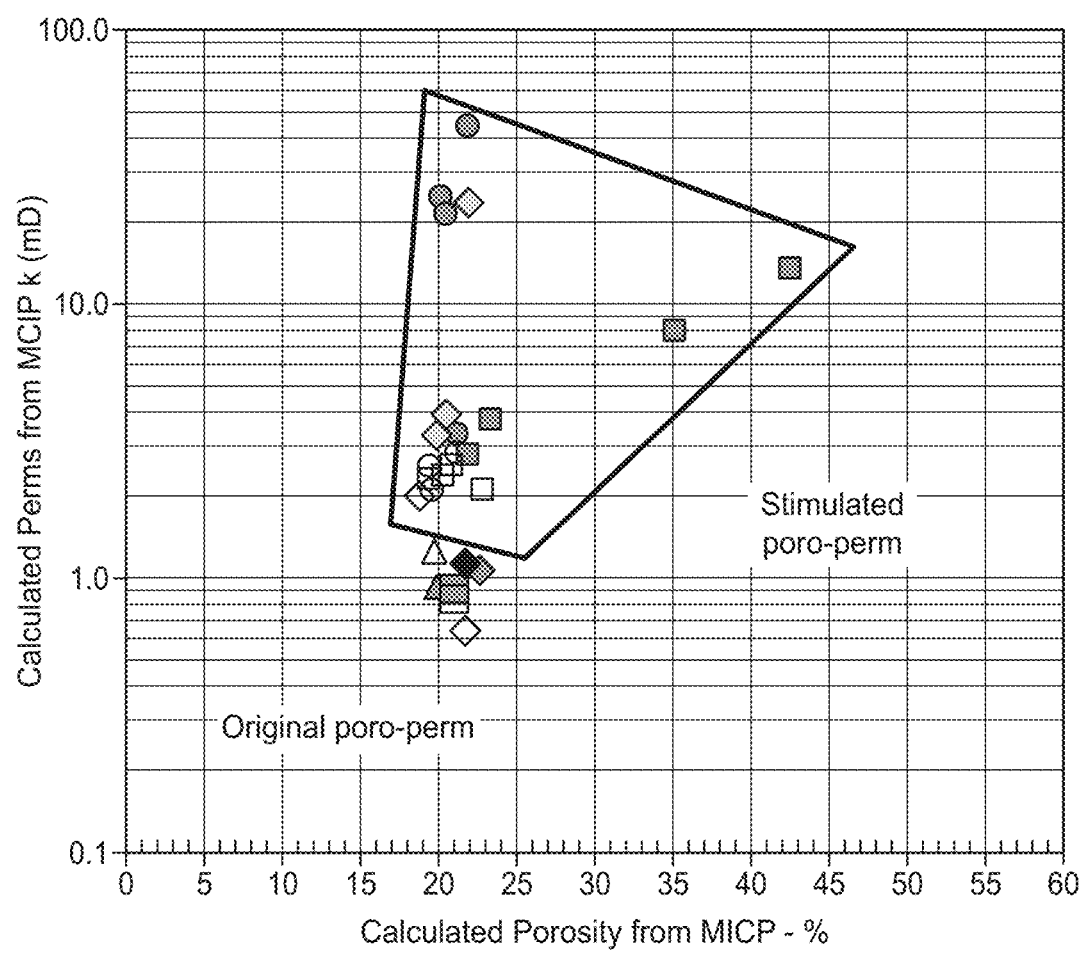
FIG. 4C is a chart illustrating the MICP calculated porosities and permeabilities of the samples of FIG. 4B.

FIG. 4B is a drainage mercury injection capillary pressure (MICP) chart illustrating the distribution of the pore-throat radii in samples taken from various locations of the core sample seen in FIG. 4A. FIG. 4C show MICP calculated porosities and permeabilities of the same samples shown in FIG. 4B. As seen in FIG. 4A, the use of the stimulation techniques caused an increase in the radii of the pore throats in the samples. This, suggests that not only were wormholes formed (scale >>100 μm pore-throats) (as seen in FIG. 4A) but also that the matrix (scale <10 μm pore-throats) was being dissolved (even though the matrix dissolution could not be seen in FIG. 4A due to the resolution of the micro-CT scan). Thus, FIG. 4B illustrates that the acid injection techniques can increase in the dominant pore-throat size through matrix dissolution. Further, as seen in FIG. 4C, the MICP-derived permeabilities increased by a factor of up to 40 relative to the original permeability of the core sample used in the test. Thus, the present methods and techniques can be used to effectively stimulate the subsurface formation at great distances from the wellbore by creating both wormholing and matrix dissolution. This is important as the matrix dissolution provides matrix support such that there is not a rapid production decay after the stimulation is complete.

Another benefit is that the methods can be used to dispose of industrial or reservoir waste streams comprising carbon oxides (e.g., $CO_x$), sulfur oxides (e.g., $SO_x$), and/or nitrogen oxides (e.g., $NO_x$). That is, carbon dioxide streams from industrial or reservoir waste streams can be used to form the wet acid-forming gas. For example, a gaseous stream that was produced from an oil-producing reservoir, can be used to form the wet acid-forming gases described herein and reinjected into the subsurface formation. Thus, the present methods can be used as a method for carbon dioxide recapture and sequestration, while obtaining the benefit of stimulating the hydrocarbon-containing subsurface formation.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

The invention claimed is:

1. A method for stimulating a hydrocarbon-containing subsurface formation, comprising:

selecting a wet acid-forming gas based on subsurface formation rock type to dissolve the subsurface formation to increase permeability of the subsurface formation;

preparing the wet acid-forming gas by combining an acid-forming fluid with a saturating amount of a wetting agent fluid at subsurface formation pressure and temperature conditions in the subsurface formation at a point of injection into the subsurface formation wherein the prepared acid-forming gas is in a single phase, the phase being a gaseous or supercritical phase with regard to pressure and temperature in the subsurface formation at the point of injection into the subsurface formation;

injecting the wet acid-forming gas into the subsurface formation at the gaseous or supercritical phase therein;

reacting the wet acid-forming gas with the subsurface formation to dissolve portions of the subsurface formation to increase the permeability of the subsurface formation for a time period of at least 1 hour and less than 1 year; and producing hydrocarbons from the subsurface formation.

2. The method of claim 1, wherein the wet acid-forming gas reacts with the subsurface formation for a time period of at least 6 hours, or at least 12 hours, or at least 18 hours.

3. The method of claim 1, wherein the wet acid-forming gas reacts with the subsurface formation for a time period of from 1 hour to 1 year or for a time period of from 1 hour to 1 week.

4. The method of claim 1, wherein the wet acid-forming gas reacts with the subsurface formation for a time period of less than 3 days, less than 2 days, or less than 1 day.

5. The method of claim 1, wherein the wet acid-forming gas reacts with the subsurface formation for a time period of greater than 1 hour, greater than 5 hours, greater than 10 hours, greater than 12 hours, greater than 18 hours, or greater than 24 hours.

6. The method of claim 1, wherein at reservoir conditions the wet acid-forming gas is a gas saturated with respect to water.

7. The method of claim 1, wherein the wet acid-forming gas is injected at conditions such that there is no liquid water present in the wet acid-forming gas when the wet acid-forming gas reaches the point of injection in the subsurface formation.

8. The method of claim 1, wherein the wet acid-forming gas comprises an acid-forming fluid selected from carbon dioxide, carbon monoxide, gaseous hydrochloric acid, chlorine gas, gaseous hydrogen sulfide, gaseous hydrofluoric acid, gaseous sulfur oxides, gaseous nitrogen oxides, and combinations thereof.

9. The method of claim 1, wherein the wet acid-forming gas comprises water and carbon dioxide.

10. The method of claim 1, wherein the wet acid-forming gas comprises carbon dioxide and wherein at reservoir conditions the wet acid-forming gas is a water-saturated supercritical fluid.

11. The method of claim 1, wherein the wet acid-forming gas comprises carbon dioxide and from about 0.1 mole % to about 6 mole % water.

12. The method of claim 1, wherein the subsurface formation comprises carbonate rock.

13. The method of claim 1, wherein the subsurface formation comprises at least 5% carbonate rock.

14. The method of claim 1, wherein the subsurface formation comprises carbonate cements, such as microporous carbonate cements.

15. The method of claim 1, wherein the wet acid-forming gas is injected into the subsurface formation through one or more nozzles.

16. The method of claim 15, wherein the velocity of the wet acid-forming gas being injected through the nozzle is controlled.

17. The method of claim 1, wherein the method further comprises introducing a hydraulic fracture fluid to the subsurface formation before the injecting of the wet acid-forming gas.

18. The method of claim 17, wherein the hydraulic fracture fluid comprises proppant.

19. The method of claim 1, wherein the method further comprises introducing an acidic aqueous solution to the subsurface formation after the injecting of the wet acid-forming gas.

20. The method of claim 19, wherein the acidic aqueous solution is in the liquid phase.

21. The method of claim 19, wherein the acidic aqueous solution comprises hydrochloric acid, hydrofluoric acid, and combinations thereof.

22. The method of claim 1, wherein the time period is based on an estimate of a reaction rate and distance that the wet acid-forming gas travels within the subsurface formation based on subsurface formation pressures and rock type.

23. A method for stimulating a hydrocarbon-containing subsurface formation, comprising:

selecting a wet acid-forming gas based on subsurface formation rock type to dissolve the subsurface formation to increase permeability of the subsurface formation;

determining conditions to form a wet acid-forming gas by combining an acid-forming fluid with a saturating amount of a wetting agent fluid at subsurface formation pressure and temperature conditions in the subsurface formation at a point of injection into the subsurface formation wherein the prepared acid-forming gas is in a single phase, the phase being a gaseous or supercritical phase with regard to pressure and temperature in the subsurface formation at the point of injection into the subsurface formation;

injecting water and an acid-forming gas through separate conduits into the subsurface formation, wherein the water and acid-forming gas are maintained separated until reaching a point of injection in the subsurface formation;

mixing the water and acid-forming gas to form the wet acid-forming gas at the point of injection in the subsurface formation;

passing the wet acid-forming gas into the subsurface formation in the gaseous or supercritical phase;

reacting the wet acid-forming gas with the subsurface formation to dissolve portions of the subsurface formation to increase the permeability of the subsurface formation for a time period of at least 1 hour and less than 1 year; and producing hydrocarbons from the subsurface formation.

24. The method of claim 23, wherein the separate conduits are in the same wellbore.

25. The method of claim 23, wherein the wet acid-forming gas is injected into the subsurface formation using a downhole humidifier.

26. The method of claim 25, wherein the method further comprises:

supplying a stream of a wetting agent to a downhole humidifier, wherein the downhole humidifier comprises a heater and a mixing volume;

supplying a stream of an acid-forming fluid to the downhole humidifier;
heating the wetting agent and the acid-forming fluid;
generating in the downhole humidifier the wet acid-forming gas; and
introducing the wet acid-forming gas to the subsurface formation.

\* \* \* \* \*